J. M. SMITH.
RAIL JOINT.
APPLICATION FILED JULY 17, 1911.
1,020,627.
Patented Mar. 19, 1912.
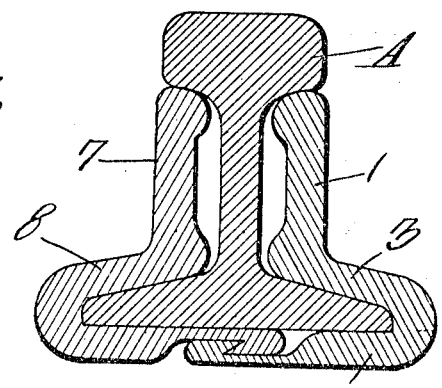
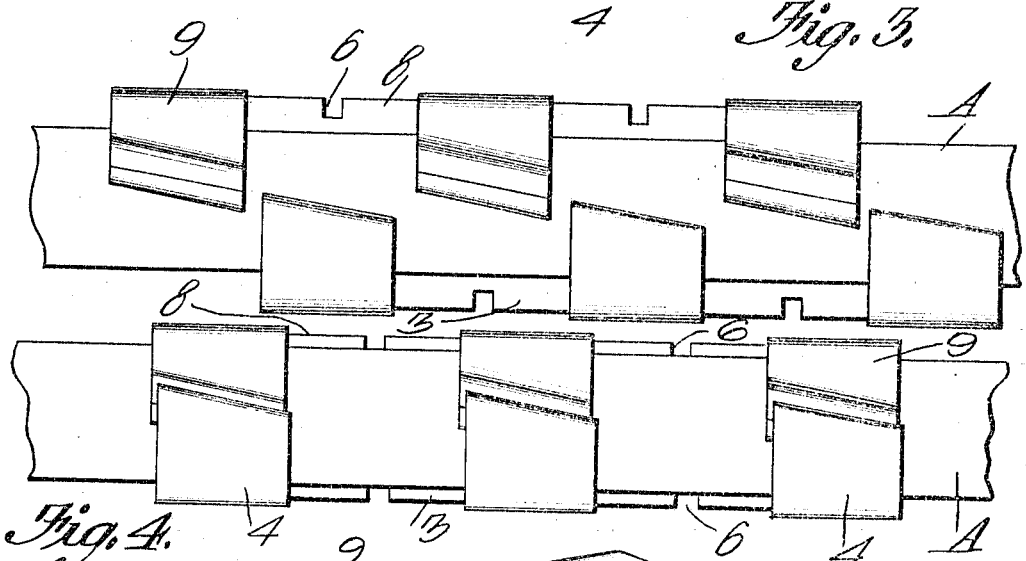
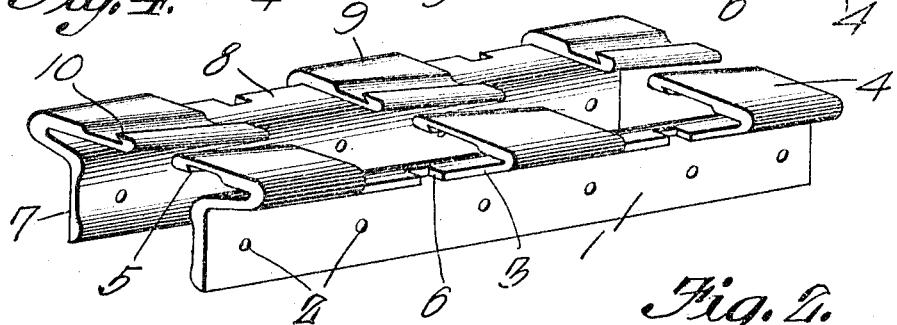
Witnesses
Jabez M. Smith
Inventor
by C. A. Snow & Co.
Attorneys

UNITED STATES PATENT OFFICE.

JABEZ M. SMITH, OF MALVERN, ARKANSAS.

RAIL-JOINT.

1,020,627.

Specification of Letters Patent.

Patented Mar. 19, 1912.

Application filed July 17, 1911. Serial No. 638,921.

*To all whom it may concern:*

Be it known that I, JABEZ M. SMITH, a citizen of the United States, residing at Malvern, in the county of Hot Spring and State of Arkansas, have invented a new and useful Rail-Joint, of which the following is a specification.

This invention relates to rail joints and more particularly to fish plates of novel form having means adapted to extend under the rails and which are designed to engage so as to prevent the fish plates from spreading apart laterally, said engaging means being so shaped as to bind the fish plates upon the rails therebetween when said fish plates are shifted in opposite directions relative to each other.

Another object is to provide fish plates which are simple and durable in construction and which can be readily applied to the rails.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a vertical transverse section through a rail having the present improvements combined therewith. Fig. 2 is a perspective view of the two fish plates inverted and separated. Fig. 3 is a bottom plan view of the fish plates, the same being shown in the relative positions in which they are placed prior to being shifted into engagement with each other. Fig. 4 is a view similar to Fig. 3 and showing the two fish plates in engagement with each other.

Referring to the figures by characters of reference 1 designates a fish plate having the usual bolt holes 2 and provided with a flange 3 adapted to bear downwardly upon one of the base flanges of a rail A. Preferably three tongues, indicated at 4, are extended inwardly from the outer edge of the flange 3 and extend under said flange, these tongues being spaced apart distances slightly greater than the width of the tongues. Each tongue 4 has its free end portion reduced in thickness and formed with a cleat 5, said cleat being inclined relative to the outer edge of the flange 3 and all of the cleats being parallel. Spike receiving notches 6 are formed in the outer edge of the flange 3 and between the tongues 4. The other fish plate 7 of the device has a flange 8 similar to the flange 3 and from which extends preferably three tongues 9 spaced apart distances slightly greater than the width of the tongues. Each of these tongues has its free end portion reduced and provided with a cleat 10 inclined relative to the outer edge of the flange 8. The cleats 10 are all parallel and extend under the tongues 9 whereas the cleats 5 overhang the tongues 4.

When it is desired to assemble the fish plates at opposite sides of rails to be secured together, one of the fish plates is shifted longitudinally so as to bring its tongues opposite the spaces on the other fish plate after which the two fish plates are moved toward each other so as to bring the tongues in the spaces opposite thereto. This position of the tongues has been illustrated in Fig. 3. By hammering on the projecting end of either fish plate, the obliquely disposed cleats 5 and 10 will be brought into engagement as a result of the longitudinal movement of the fish plate being driven. The two fish plates will thus be drawn toward each other and will bind firmly upon opposite sides of the rails. After the desired adjustment has been effected, the fish plates can be fastened to a tie by means of spikes, such as ordinarily employed, these spikes being seated within the notches 6 in the two flanges 3 and 8.

Under some conditions the fish plates may not be bolted to the rails as the clamping action thereof will be sufficient to hold the rails properly in alinement. Ordinarily, however, bolts, such as usually employed, are extended through the rails and through the openings 2 in the fish plates.

Importance is attached to the fact that, in order to fasten the fish plates together, it is not necessary to shift them any considerable distance relative to each other. This is due to the fact that the tongues are disposed in staggered relation and a very slight movement of one of the fish plates relative to the other is sufficient to bring all of the tongues into engagement. It will be noted, by referring to Fig. 1, that the lower faces of the tongues are all located in the same plane so that they can thus rest smoothly on the top of a tie. If preferred, however, the tongues when assembled in interlocked relation, can be disposed between the ties so that the notched portions of the flanges 3 and 8 will rest flat upon the ties.

What is claimed is:—

1. A rail joint including opposed fish plates having base flanges, a series of spaced similar tongues on one base flange, engaging means upon the tops of said tongues, a series of spaced similar tongues on the other base flange, engaging means upon the bottoms thereof, the tongues of either series being insertible between the tongues of the other series and shiftable longitudinally of the bases to bring the engaging means thereon into engagement with the engaging means on the other tongues, said means coöperating to draw the fish plates toward each other during such longitudinal movement.

2. A rail joint including opposed fish plates having base flanges, a series of tongues extending from and under each of said flanges, said tongues being spaced apart distances slightly greater than the width of the tongues, obliquely disposed cleats upon one face of the tongues of one series, corresponding cleats upon the opposed face of the tongues of the other series, all of said cleats coöperating during the longitudinal movement of one of the cleats relative to the other cleats, to draw said plates toward each other.

In testimony that I claim the foregoing as my own, I have hereto affixed my signature in the presence of two witnesses.

JABEZ M. SMITH.

Witnesses:
J. B. ALFORD,
WILLIAM H. HANSFORD.

---

Copies of this patent may be obtained for five cents each, by addressing the "Commissioner of Patents, Washington, D. C."